(12) United States Patent
Fu et al.

(10) Patent No.: US 12,531,108 B2
(45) Date of Patent: Jan. 20, 2026

(54) MEMORY DEVICE, OPERATION METHOD, AND MEMORY SYSTEM

(71) Applicant: YANGTZE MEMORY TECHNOLOGIES CO., LTD., Wuhan (CN)

(72) Inventors: Yong Fu, Wuhan (CN); ShiYang Yang, Wuhan (CN); Ling Ding, Wuhan (CN)

(73) Assignee: Yangtze Memory Technologies Co., Ltd., Hubei (CN)

( * ) Notice: Subject to any disclaimer, the term of this patent is extended or adjusted under 35 U.S.C. 154(b) by 80 days.

(21) Appl. No.: 18/662,519

(22) Filed: May 13, 2024

(65) Prior Publication Data
US 2025/0166691 A1 May 22, 2025

(30) Foreign Application Priority Data

Nov. 16, 2023 (CN) .......................... 202311545971.X

(51) Int. Cl.
| | | |
|---|---|---|
| G11C 8/00 | (2006.01) | |
| G11C 11/4076 | (2006.01) | |
| G11C 11/4096 | (2006.01) | |
| G11C 11/4099 | (2006.01) | |

(52) U.S. Cl.
CPC ...... G11C 11/4076 (2013.01); G11C 11/4096 (2013.01); G11C 11/4099 (2013.01)

(58) Field of Classification Search
CPC ............ G11C 11/4076; G11C 11/4096; G11C 11/4099

USPC ....................................................... 365/233.1
See application file for complete search history.

(56) References Cited

U.S. PATENT DOCUMENTS

| | | | | |
|---|---|---|---|---|
| 6,166,990 A | * | 12/2000 | Ooishi | G11C 11/4076 365/194 |
| 6,356,484 B2 | * | 3/2002 | Dosaka | G11C 8/00 365/189.05 |
| 6,751,156 B2 | * | 6/2004 | Hsu | G11C 7/222 365/194 |
| 10,977,121 B2 | * | 4/2021 | Hung | G11C 16/0483 |

FOREIGN PATENT DOCUMENTS

| | | | | | |
|---|---|---|---|---|---|
| CN | 113886300 A | * | 1/2022 | ......... | G06F 13/4291 |
| CN | 120015074 A | * | 5/2025 | ............ | G11C 7/225 |
| JP | 2001110185 A | * | 4/2001 | ......... | G11C 11/4074 |
| KR | 20170027017 A | * | 3/2017 | ............ | G08C 19/00 |

* cited by examiner

*Primary Examiner* — Viet Q Nguyen
(74) *Attorney, Agent, or Firm* — Conley Rose, P.C.

(57) ABSTRACT

Examples of the present application disclose a memory device, an operation method, and a memory system. The memory device includes: a bias generation circuit configured to generate a target bias signal according to a data transfer rate of the memory device, wherein the target bias signal varies with a preset data transfer rate range; and a clock buffer circuit coupled with the bias generation circuit and configured to perform, based on the target bias signal, conversion processing on an input clock signal matched with the data transfer rate to obtain a target clock signal used by the memory device.

20 Claims, 11 Drawing Sheets

MEMORY DEVICE, OPERATION METHOD, AND MEMORY SYSTEM

CROSS-REFERENCE TO RELATED APPLICATIONS

The present application claims priority to Chinese Patent Application No. 202311545971X, which was filed Nov. 16, 2023, is titled "MEMORY DEVICE, OPERATION METHOD, AND MEMORY SYSTEM," and is hereby incorporated herein by reference in its entirety.

TECHNICAL FIELD

The present application relates to the technical field of memories, and particularly to a memory device, an operation method, and a memory system.

BACKGROUND

With the development of technology, the data transfer rate of memory devices continues to increase. In other words, the memory devices can have operating modes with various data transfer rates. In order to enable the memory devices to support these data transfer rates, it is necessary to keep a clock input buffer (WCK IB) in a high-power-consumption operating state all the time.

SUMMARY

In view of this, examples of the present application provide a memory device and a memory system.

In a first aspect, examples of the present application provide a memory device, comprising:
  a bias generation circuit configured to generate a target bias signal according to a data transfer rate of the memory device, wherein the target bias signal varies with a preset data transfer rate range; and
  a clock buffer circuit coupled with the bias generation circuit and configured to perform, based on the target bias signal, conversion processing on an input clock signal matched with the data transfer rate to obtain a target clock signal used by the memory device.

In the above solution, the bias generation circuit includes a control sub-circuit and a generation sub-circuit, wherein
  the control sub-circuit is configured to obtain a configuration code to characterize the data transfer rate, perform conversion processing on the configuration code to generate a bias control signal, and transfer the bias control signal to the generation sub-circuit; and
  the generation sub-circuit is coupled with the control sub-circuit, and configured to generate, in response to the bias control signal, the target bias signal.

In the above solution, the control sub-circuit includes a storage circuit and a decoding circuit, wherein
  the storage circuit is configured to store the configuration code; and
  the decoding circuit is connected with the storage circuit, and is configured to obtain the configuration code from the storage circuit, and perform conversion processing on the configuration code to generate the bias control signal.

In the above solution, the target bias signal includes a bias current signal; and the generation sub-circuit includes a voltage division circuit and a conversion circuit, wherein
  the voltage division circuit is configured to perform, in response to the bias control signal, voltage division processing on a reference voltage signal to generate a bias voltage signal; and
  the conversion circuit is configured to convert the bias voltage signal to obtain the bias current signal,
  wherein the reference voltage signal is obtained according to a maximum data transfer rate supported by the memory device.

In the above solution, the bias control signal includes a first bias control sub-signal and a second bias control sub-signal. The voltage division circuit includes a first adjustable resistor and a second adjustable resistor, wherein
  a first end of the first adjustable resistor is connected to the reference voltage signal, a second end of the first adjustable resistor is connected with a first end of the second adjustable resistor, and a control end of the first adjustable resistor is connected to the first bias control sub-signal;
  a second end of the second adjustable resistor is grounded; and a control end of the second adjustable resistor is connected to the second bias control sub-signal,
  wherein under the control of the first bias control sub-signal and/or the second bias control sub-signal, the bias voltage signal is output at a joint of the first adjustable resistor and the second adjustable resistor.

In the above solution, an adjustable range of the first adjustable resistor and that of the second adjustable resistor are the same.

In the above solution, the first bias control sub-signal and the second bias control sub-signal are the same.

In the above solution, the control sub-circuit is further configured to obtain a reference control signal according to a maximum data transfer rate supported by the memory device; and
  the voltage division circuit further includes a reference voltage generator, which is connected with the control sub-circuit, and is configured to obtain the reference control signal from the control sub-circuit, and output, in response to the reference control signal, the reference voltage signal.

In the above solution, the configuration code includes a plurality of bits; and the plurality of bits represent read latency RL information or write latency WL information corresponding to the data transfer rate.

In the above solution, the decoding circuit is configured to generate the bias control signal according to at least one of the plurality of bits,
  wherein a plurality of sets of different bias control signals can be generated according to a different value of each of the at least one bit; and the plurality of sets of bias control signals are not simultaneously in a valid state.

In the above solution, the configuration code includes 4 bits, wherein 2 of the 4 bits may be configured to generate 4 sets of bias control signals.

In the above solution, the memory device further includes a clock frequency division circuit and a clock driving circuit, wherein
  the clock frequency division circuit is respectively connected with the bias generation circuit and the clock buffer circuit, and is configured to perform, in response to the target bias signal, frequency division processing on the target clock signal to generate a multi-path phase-splitting clock signal with adjusted frequency and phase; and the clock driving circuit is respectively connected with the bias generation circuit and the clock frequency division circuit, and is configured to transfer, in response to the target bias signal, the multi-path phase-splitting clock signal to a respective I/O circuit in the memory device.

In the above solution, as the data transfer rate included in the preset data transfer rate range increases, the target bias signal increases, which needs higher power consumption by the clock buffer circuit to buffer, based on the target bias signal, an input clock signal corresponding to the data transfer rate.

In a second aspect, examples of the present application further provide an operation method of a memory device. The method includes:
  generating a target bias signal according to a data transfer rate of the memory device, wherein the target bias signal varies with a preset data transfer rate range; and
  performing, based on the target bias signal, conversion processing on an input clock signal matched with the data transfer rate to obtain a target clock signal used by the memory device.

In the above solution, the generating the target bias signal according to the data transfer rate of the memory device includes:
  obtaining a configuration code to characterize the data transfer rate, and performing conversion processing on the configuration code to generate a bias control signal; and
  generating, in response to the bias control signal, the target bias signal.

In the above solution, the target bias signal includes a bias current signal; and the generating, in response to the bias control signal, the target bias signal includes:
  performing, in response to the bias control signal, voltage division processing on a reference voltage signal to generate a bias voltage signal; and
  converting the bias voltage signal to obtain the bias current signal,
  wherein the reference voltage signal is obtained according to a maximum data transfer rate supported by the memory device.

In the above solution, the configuration code includes a plurality of bits; and the plurality of bits represent read latency RL information or write latency WL information corresponding to the data transfer rate.

In the above solution, the performing the conversion processing on the configuration code to generate the bias control signal includes:
  generating the bias control signal according to at least one of the plurality of bits,
  wherein a plurality of sets of different bias control signals can be generated according to a different value of each of the at least one bit; and the plurality of sets of bias control signals are not simultaneously in a valid state.

In the above solution, the bias control signal includes a first bias control sub-signal and/or a second bias control sub-signal, wherein under the control of the first bias control sub-signal and/or the second bias control sub-signal, voltage division processing is performed on the reference voltage signal to generate the bias voltage signal.

In the above solution, the method further includes:
  performing, in response to the target bias signal, frequency division processing on the target clock signal to generate a multi-path phase-splitting clock signal with adjusted frequency and phase; and
  transferring, in response to the target bias signal, the multi-path phase-splitting clock signal to a respective I/O circuit in the memory device.

In a third aspect, examples of the present application further provide a memory system, comprising:
  a memory controller configured to send a first command; and
  one or more memory devices coupled with the memory controller, and configured to configure, in response to the first command, a data transfer rate of the memory device, generate a target bias signal according to the data transfer rate, and perform, based on the target bias signal, conversion processing on an input clock signal matched with the data transfer rate to obtain a target clock signal used by the memory device, wherein the target bias signal varies with a preset data transfer rate range.

In the above solution, the memory device includes:
  a bias generation circuit configured to generate a target bias signal according to the data transfer rate; and
  a clock buffer circuit coupled with the bias generation circuit, and configured to perform, based on the target bias signal, conversion processing on the input clock signal to obtain the target clock signal.

In the above solution, the bias generation circuit includes a control sub-circuit and a generation sub-circuit, wherein
  the control sub-circuit is configured to obtain a configuration code to characterize the data transfer rate, perform conversion processing on the configuration code to generate a bias control signal, and transfer the bias control signal to the generation sub-circuit; and
  the generation sub-circuit is coupled with the control sub-circuit, and configured to generate, in response to the bias control signal, the target bias signal.

In the above solution, the control sub-circuit includes a storage circuit and a decoding circuit, wherein
  the storage circuit is configured to store the configuration code; and
  the decoding circuit is connected with the storage circuit, and is configured to obtain the configuration code from the storage circuit, and perform conversion processing on the configuration code to generate the bias control signal.

In the above solution, the target bias signal includes a bias current signal; and the generation sub-circuit includes a voltage division circuit and a conversion circuit, wherein
  the voltage division circuit is configured to perform, in response to the bias control signal, voltage division processing on a reference voltage signal to generate a bias voltage signal; and
  the conversion circuit is configured to convert the bias voltage signal to obtain the bias current signal,
  wherein the reference voltage signal is obtained according to a maximum data transfer rate supported by the memory device.

In the above solution, the bias control signal includes a first bias control sub-signal and a second bias control sub-signal. The voltage division circuit includes a first adjustable resistor and a second adjustable resistor, wherein
  a first end of the first adjustable resistor is connected to the reference voltage signal, a second end of the first adjustable resistor is connected with a first end of the second adjustable resistor, and a control end of the first adjustable resistor is connected to the first bias control sub-signal;

a second end of the second adjustable resistor is grounded; and a control end of the second adjustable resistor is connected to the second bias control sub-signal, wherein under the control of the first bias control sub-signal and/or the second bias control sub-signal, the bias voltage signal is output at a joint of the first adjustable resistor and the second adjustable resistor.

Examples of the present application provide a memory device, an operation method, and a memory system. The memory device includes a bias generation circuit configured to generate a target bias signal according to a data transfer rate of the memory device, wherein the target bias signal varies with a preset data transfer rate range; and a clock buffer circuit coupled with the bias generation circuit and configured to perform, based on the target bias signal, conversion processing on an input clock signal matched with the data transfer rate to obtain a target clock signal used by the memory device. The memory device provided by the examples of the present application includes the bias generation circuit. The bias generation circuit may obtain the target bias signal according to the data transfer rate of the memory device, such that the clock buffer circuit obtains the target clock signal according to the target bias signal, that is, the bias generation circuit may generate, according to the data transfer rate, the target bias signal varying with the preset data transfer rate range. The target bias signal may also cause the clock buffer circuit to output the target clock signal used by the memory device, and accordingly, in the case of the small data transfer rate, the clock buffer circuit may meet the data transfer requirements without using a large operating current or operating voltage. In other words, when the data transfer rate is large, the working current used by the clock buffer circuit is large, and when the data transfer rate is small, the working current used by the clock buffer circuit is small, thereby making the clock buffer circuit work at different currents or voltages without operating at the largest working current or voltage all the time when the memory device works at different data transfer rates, and therefore the power is saved.

BRIEF DESCRIPTION OF THE DRAWINGS

In the drawings not necessarily drawn to scale, the like numerals may describe similar circuits in different views. Like numerals having different letter suffixes may represent different examples of similar circuits. The drawings illustrate generally, by way of example, but not by way of limitation, various examples discussed in the present document.

DETAILED DESCRIPTION

Figure 1:
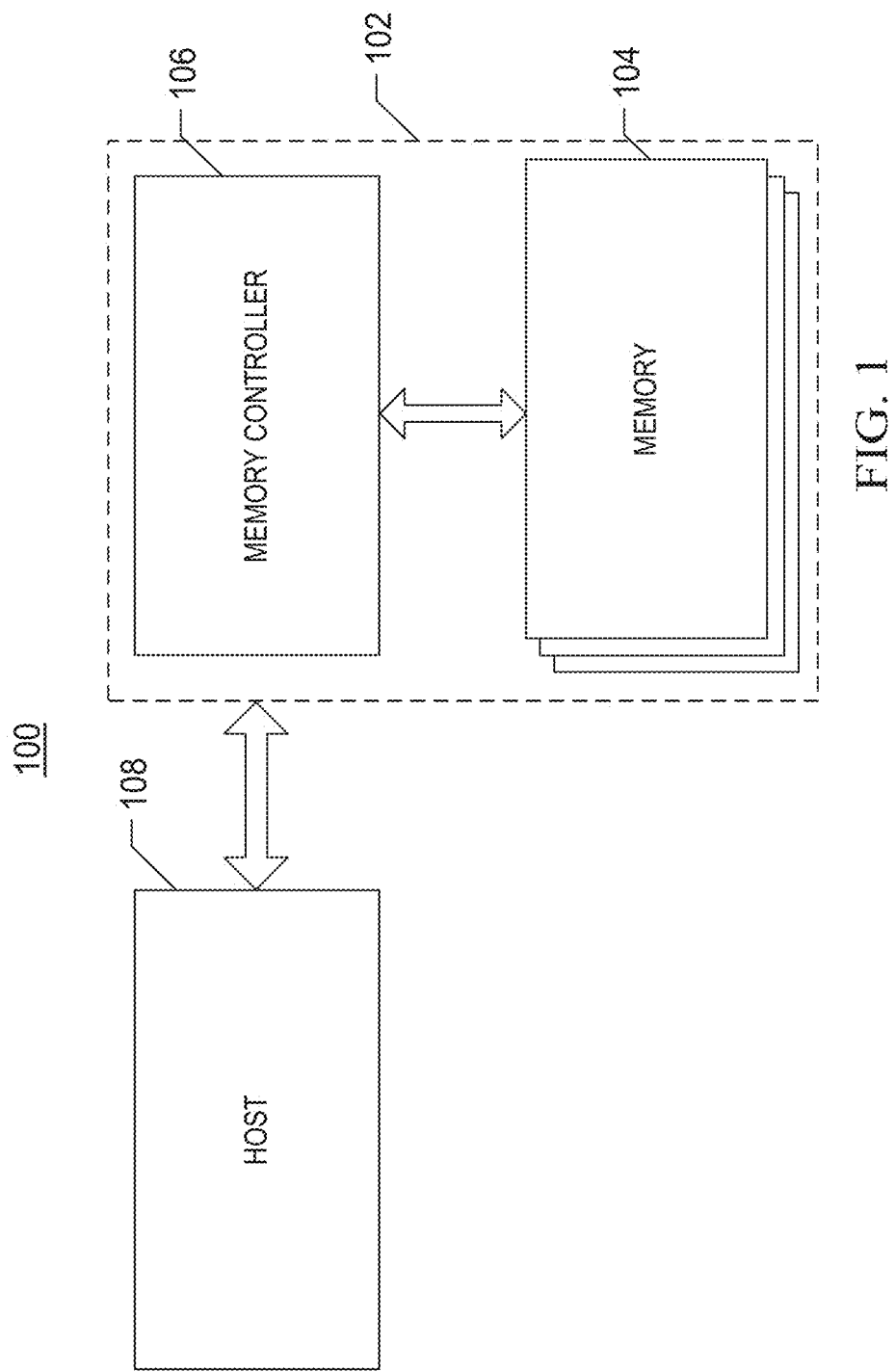
FIG. 1 is a schematic diagram of an example system having a memory system provided by an example of the present application.

Example implementations disclosed by the present application will be described below in more detail with reference to the drawings. Although example implementations of the present application are shown in the drawings, it is to be understood that, the present application may be implemented in various form without being limited by the example implementations as set forth herein. Rather, these implementations are provided in order for understanding the present application more thoroughly, and can fully convey the scope disclosed by the present application to those skilled in the art.

In the description below, many example details are presented to provide a more thorough understanding of the present application. However, it is apparent to those skilled in the art that the present application may be carried out without one or more of these details. In other examples, in order to avoid confusing with the present application, some technical features well-known in the art are not described; that is, not all features of actual examples are described herein, and well-known functions and structures are not described in detail.

In the drawings, sizes and relative sizes of layers, areas and elements may be exaggerated for clarity. Like reference numerals denote like elements throughout.

It is to be understood that when an element or a layer is referred to as being "on", "adjacent to", "connected to", or "coupled to" other elements or layers, it may be directly on, adjacent to, connected to, or coupled to the other elements or layers, or intervening elements or layers may be present. In contrast, when an element is referred to as being "directly on", "directly adjacent to", "directly connected to", or "directly coupled to" other elements or layers, no intervening elements or layers are present. It is to be understood that, although the terms first, second, third, etc., may be used to describe various elements, components, areas, layers and/or portions, these elements, components, areas, layers and/or portions should not be limited by these terms. These terms are only used to distinguish one element, component, area, layer or portion from another element, component, area, layer or portion. Thus, a first element, component, area, layer or portion discussed below may be represented as a second element, component, area, layer or portion, without departing from the teachings of the present application. When the second element, component, area, layer or portion is discussed, it does not mean that the first element, component, area, layer or portion is necessarily present in the present application.

The spatially relative terms, such as "beneath", "below", "lower", "under", "over", "upper", and the like, may be used herein for ease of description to describe one element or feature's relationship to other elements or features as illustrated in the figures. It is to be understood that, the spatially relative terms are intended to further encompass different orientations of a device in use or operation in addition to the orientation depicted in the figures. For example, if a device in the drawings is turned over, then an element or a feature described as "below other elements", or "under other elements", or "beneath other elements" will be orientated to be "above" the other elements or features. Thus, the example terms, "below" and "beneath", may comprise both upper and lower orientations. The device may be orientated otherwise (rotated by 90 degrees or other orientations), and the spatially descriptive terms used herein are interpreted accordingly.

The terms used herein are only intended to describe the examples, and are not used as limitations of the present application. As used herein, unless otherwise indicated expressly in the context, "a", "an", and "the" in a singular form are also intended to comprise a plural form. It should also be understood that the terms "consist of" and/or "comprise", when used in this specification, determine the presence of the feature, integer, step, operation, element and/or component, but do not preclude the presence or addition of one or more of other features, integers, steps, operations, elements, components, and/or groups. As used herein, the term "and/or" comprises any or all combinations of the listed relevant items.

In order to be capable of understanding the characteristics and the technical contents of the examples of the present application in more detail, implementation of the examples of the present application is set forth in detail below in conjunction with the drawings, and the appended drawings are only used for reference and illustration, instead of being used to limit the examples of the present application.

FIG. 1 shows a block diagram of an example system having a memory system. In FIG. 1, the system 100 may be a mobile phone, a desktop computer, a laptop computer, a tablet computer, a vehicle computer, a gaming console, a printer, a pointing apparatus, a wearable electronic apparatus, a smart sensor, a virtual reality (VR) apparatus, an augmented reality (AR) apparatus, or any other suitable electronic apparatuses having storages therein. As shown in FIG. 1, the system 100 may comprise a host 108 and a memory system 102, wherein the memory system 102 has one or more memories 104 and a memory controller 106; and the host 108 may be, for example, a central processing unit (CPU) or a graphics processing unit (GPU). The host 108 may be configured to send or receive data to or from the memories 104 through the memory controller 106.

The memory controller 106 is coupled to the memory 104 and the host 108, and configured to control the memory 104. The memory controller 106 can manage the data stored in the memory 104 and communicate with the host 108.

The memory controller 106 may be configured to control operations of the memory 104, such as read, erase, write, and refresh operations. In some implementations, the memory controller 106 may further perform any other suitable functions, for example, formatting the memory 104. The memory controller 106 may communicate with an external apparatus (e.g., the host 108) according to an example communication protocol.

In some examples, the one or more memories 104 and the memory controller 106 may all be integrated into various types of storage apparatuses. For example, the plurality of memories 104 may be integrated into a memory module; and the memory controller 106 may be integrated into a northbridge of a mainboard or directly integrated into the CPU. That is to say, the memory system 102 may be implemented and packaged into different types of end electronic products.

Figure 2:
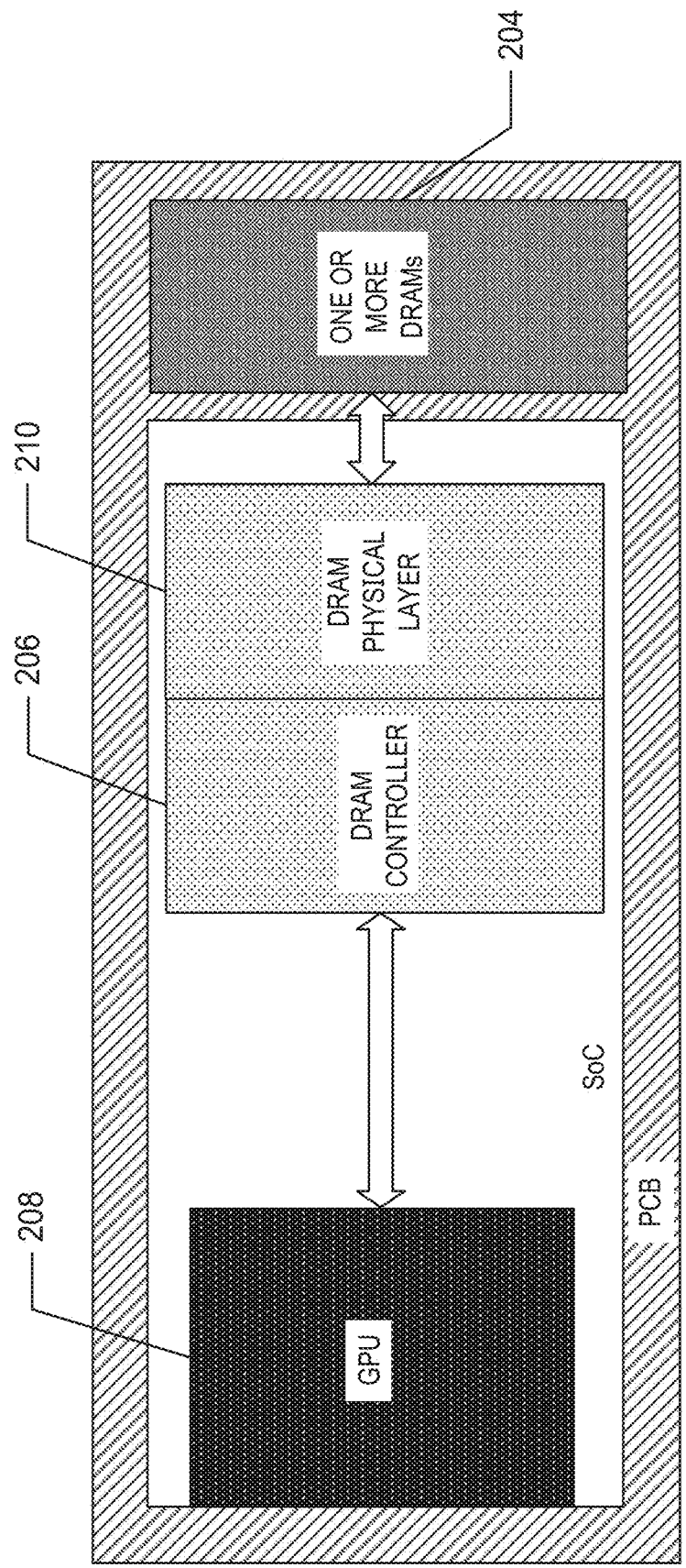
FIG. 2 is a schematic diagram of an example electronic device having a memory system provided by an example of the present application.

In one system example shown in FIG. 2, the system comprises a system on chip (SoC) and one or more memories. The memory comprises a DRAM 204. The SoC comprises: a graphics processing unit (GPU) 208, a DRAM controller 206, and a DRAM physical layer 210, wherein the DRAM controller 206 is responsible for scheduling of read and write instructions and timing control of the DRAM 204; and the DRAM physical layer 210 is responsible for encoding the scheduled instructions according to requirements of the DRAM 204, send the respective write data to the DRAM 204, and receive the data read from the DRAM 204. A PCB represents a printed circuit board.

Figure 3:
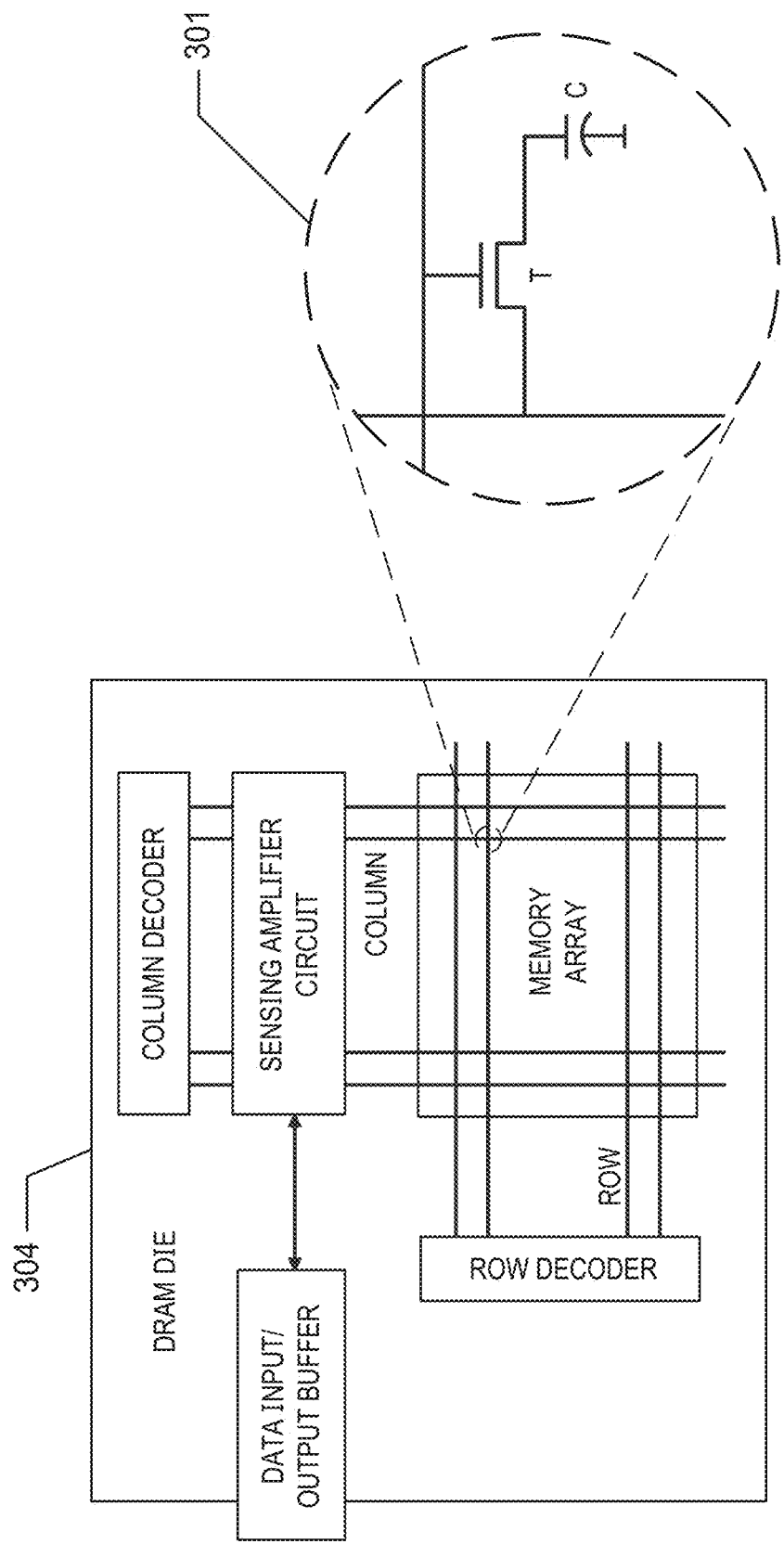
FIG. 3 is a schematic structural diagram I of an example memory device provided by an example of the present application.

FIG. 3 is a schematic diagram of an example memory device being a DRAM according to an example of the present application. On the right side of FIG. 3, a circuit of a memory cell in the DRAM is shown. Each DRAM die 304 comprises a memory array. The memory array comprises a plurality of memory cells 301 arranged in an array. Each memory cell 301 comprises one transistor (T) and one capacitor (C). The main action principle of the memory cell is to utilize an amount of charge stored in the capacitor to represent whether a binary bit is 1 or 0. The memory cells are arranged in the array, which may be considered as a typical mesh structure. The memory array designates addresses using rows and columns. By designating an intersection of a row and a column (by designating a row address and a column address of the DRAM), the memory controller may independently access various memory cells in the DRAM die, and perform operations of read or write of data stored therein.

In some examples, the memory device comprises a memory array and a peripheral circuit, wherein the memory array comprises a plurality of banks, with each bank may be divided into a plurality of memory blocks, also called memory body. Each memory block comprises a plurality of memory cell rows and a plurality of memory cell columns. Each memory cell row is coupled with one corresponding word line, and each memory cell column is coupled with one corresponding bit line. The peripheral circuit comprises a series of complementary metal-oxide-semiconductor (CMOS) control circuits. For example, this series of CMOS control circuits comprises a control circuit corresponding to each memory block, such as a sensing amplifier (SA) circuit, a word-line driver (WLD) circuit, etc.; a control circuit corresponding to each bank, such as a row decoder, a column decoder, etc.; and a control circuit corresponding to all the banks, such as a command buffer, a command decoder, an address buffer, a data (input/output) buffer, a mode register, etc.

Figure 4:
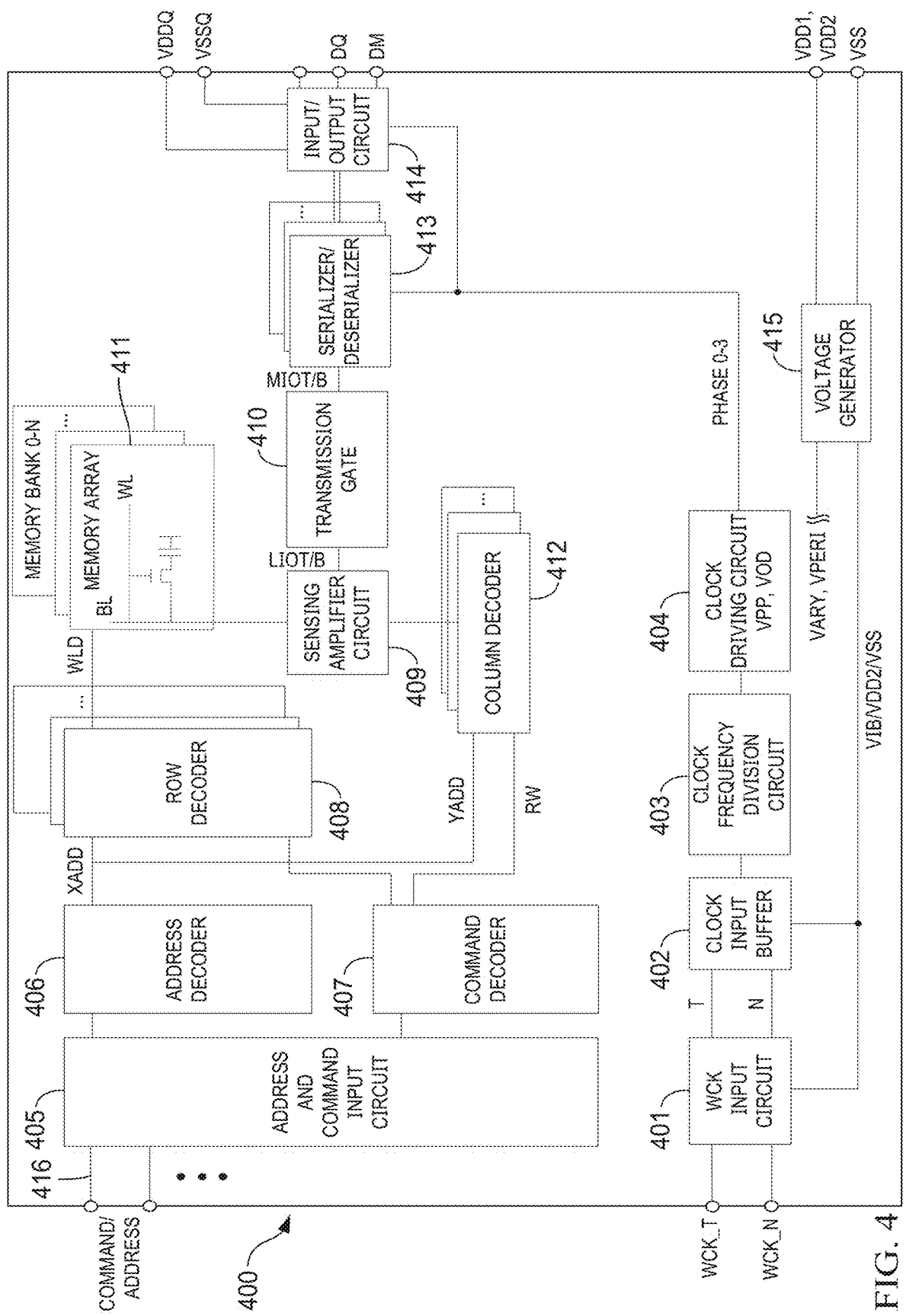
FIG. 4 is a schematic structural diagram II of an example memory device provided by an example of the present application.

During a practical application, for the layout between the memory array and the peripheral circuit, in some examples, the memory array and the peripheral circuit are disposed on the same substrate in juxtaposition. In some other examples, the memory array and the peripheral circuit may be also designed on two substrates. Regardless of whether the memory array and the peripheral circuit are designed on one substrate or two substrates, a logic relationship between the peripheral circuit and the memory array may be as shown in FIG. 3. An example connection relationship between the memory array, the peripheral circuit, and the memory device with outside may be as shown in FIG. 4. FIG. 4 is another schematic structural diagram of an example memory device being a DRAM according to an example of the present application. In FIG. 4, the memory device 400 may comprise a clock (WCK) input circuit 401, a clock input buffer 402, a clock frequency division circuit 403, a clock driving circuit 404, an address/command input circuit 405, an address decoder 406, a command decoder 407, a plurality of row (e.g., first access line) decoders 408, sensing amplifier circuits (sensing amplification circuit) 409, a transfer gate 410, a memory array 411, a plurality of column (e.g., second access line) decoders 412, a serializer/deserializer (SERDES) circuit 413, a (data) input/output (I/O) circuit (or buffer) 414, and a voltage generator circuit 415. The memory device 400 may comprise a plurality of external terminals, comprising an address and command terminal coupled to a command/address bus 416, clock terminals CK and/CK, data terminals DQ, DQS, and DM, and power supply terminals VDD1, VDD2, VSS, VDDQ, and VSSQ. The memory device may be mounted on a substrate, such as a memory module substrate, a motherboard, etc.

The memory array 411 comprises a plurality of memory blocks 0 to N, wherein each of the memory blocks 0 to N comprises a plurality of word lines WL, a plurality of bit lines BL, and a plurality of memory cells MC disposed at intersections of the plurality of word lines WL and the plurality of bit lines BL. The selection of the word lines WL of each memory block is performed by the corresponding row decoder 408, and the selection of the bit lines BL is performed by the corresponding column decoder 412. The plurality of sensing amplifier circuits 409 provided for their corresponding bit lines BL and are coupled to at least one I/O line via the transmission gate TG 410 used as a switch.

The address/command input circuit 405 may comprise the address buffer described in FIG. 3. In an example, at a command/address terminal, an address signal and a memory block address signal are received via the command/address bus 416 from outside (e.g., via the memory controller) and may be transferred to the address decoder 406. The address decoder 406 may decode the address signal received from the address/command input circuit 405, provide a row address signal XADD to the row decoder 408, and provide a column address signal YADD to the column decoder 412. The address decoder 406 may further receive the memory block address signal and provide the memory block address signal BADD to the row decoder 408 and the column decoder 412.

The address/command input circuit 405 may further comprise the command buffer described in FIG. 3. In an example, at the command/address terminal, a command signal and a chip select signal are received via the command/address bus 416 from outside (e.g., from the memory controller), and may be provided to the command decoder 407. The command signal may comprise various memory commands, such as access (e.g., read/write) commands. The chip select signal selects the memory device 400 to cause the memory device 400 to respond to the commands and addresses provided to the command and address terminal.

That is, in response to the activated chip select signal received at the memory device 400, the commands and addresses received at the command/address terminal via the command/address bus 416 may be decoded to perform memory operations. The command decoder 407 may decode the command signal to generate various internal command signals. For example, the internal command signal may comprise a row command signal for selecting a word line and a column command signal for selecting a bit line, such as a read command or a write command. The internal command signal may further comprise output and input activation commands, such as a time control command.

Therefore, when the read command is issued and the read command is supplied to the row address and the column address in time, data is read from the memory cell in the memory array 411 designated by the row address and the column address. The read command may be received by the command decoder 407. A read/write amplifier of the SERDES circuit 413 may receive read data DQ, and provide the read data DQ to the I/O circuit 414. The I/O circuit 414 may provide, via the data terminal DQ, the read data DQ along with a data masking signal at a data masking terminal DM to the outside. The read data may be provided at a time defined by read latency (RL) information, and the read latency RL information may be programed in the memory device 400 (e.g., in the mode register (not shown in FIG. 4)). The read latency (RL) information may be defined according to a clock cycle of a clock CK signal. For example, when associated read data is provided at an output via the data terminals DQ and DM, the read latency RL information may be defined as the number of clock cycles of the CK signal after the read command is received at the memory device 400.

Similarly, when the write command is issued and the write command is supplied to the row address and the column address in time, the I/O circuit 414 may then receive write data along with the data masking DM signal at the data terminal DQ, and provide the write data via the read/write amplifier of the SERDES circuit 413. The SERDES circuit 413 may provide the write data to the memory array 411. The write command may be received by the command decoder 407. Therefore, the write data may be written to the memory cell designated by the row address and the column address. The write data and the data masking signal may be respectively provided to the data terminals DQ and DM at the time defined by write latency (WL) information. The write latency WL information may be programed in the memory device 400 (e.g., in the mode register (not shown in FIG. 4)). The write latency WL information may be defined according to the clock cycle of the clock CK signal. For example, when the associated write data and the data masking signal are received at the data terminals DQ and DM, the write latency WL information may be the number of clock cycles of the CK signal after the write command is received at the memory device 400.

Turning to the explanation of the external terminal included in the memory device 400, the power supply terminal may receive power supply voltages VDD1, VDD2, and VSS. These power supply voltages VDD1, VDD2, and VSS may be supplied to the voltage generator circuit 415. The voltage generator circuit 415 may generate various internal voltages VPP, VOD, VARY, VPERI, VIB, etc. based on the power supply voltages VDD1, VDD2, and VSS. In an example, the VDD1 may be used to generate the internal voltage VIB. The internal voltage VIB may have a magnitude greater than the supply voltage VDD2. The internal voltage VPP is mainly used in the row decoder 408 and the column decoder 412. The internal voltages VOD and VARY are mainly used in the sensing amplification circuit 409. The internal voltage VIB (along with the power supply voltages VDD2 and VSS) are used in the WCK input circuit 401, the clock frequency division circuit 403, and the clock driving circuit 404. The internal voltage VPERI is used in many other circuit modules. The I/O circuit 414 may receive the power supply voltages VDDQ and VSSQ. For example, the power supply voltages VDDQ and VSSQ may be voltages respectively the same as the power supply voltages VDD1 and VSS. However, the dedicated power supply voltages VDDQ and VSSQ may be used for the I/O circuit 414.

Clock terminals WCK_T and WCK_N may receive an external clock signal WCK_T and a complementary external clock signal WCK_N respectively. In some examples, the clock signal WCK_T and the clock signal WCK_N may be write clock signals. The clock signal WCK_T and the clock signal WCK_N may be supplied to the WCK input circuit 401. The WCK input circuit 401 may generate, based on the clock signal WCK_T and the clock signal WCK_N, complementary internal clock signals T and N. The WCK input circuit 401 may provide the clock signal T and the clock signal N to the clock frequency division circuit 403 and the clock driving circuit 404. The clock frequency division circuit 403 and the clock driving circuit 404 may generate, based on the clock signal T, the clock signal N, and a clock enable signal CKE (not shown in FIG. 4), phase-controlled and frequency-controlled internal clock signals PHASE 0 to 3. The clock signals PHASE 0 to 3 may be phase-shifted by 90 degrees relative to each other. For example, the clock signal PHASE 0 is phase-shifted by 0 degree relative to the internal clock signal T. The clock signal PHASE 1 is phase-shifted by 90 degrees relative to the internal clock signal T. The clock signal PHASE 2 is phase-shifted by 180 degrees relative to the internal clock signal T. The clock signal PHASE 3 is phase-shifted by 270 degrees relative to the internal clock signal T.

The clock frequency division circuit 403 and the clock driving circuit 404 may provide the clock signals PHASE 0 to 3 to the SERDES circuit 413 and the I/O circuit 414. The SERDES circuit 413 may support high-speed read and write operations by deserializing high-speed write data and serializing high-speed read data. For example, during the high-speed write operation, the I/O circuit 414 may receive and buffer (e.g., via the input buffer) the serialized write data in response to the clock signals PHASE 0 to 3. The SERDES circuit 413 may be configured to retrieve, in response to the clock signals PHASE 0 to 3, the serialized write data from the input buffer of the I/O circuit 414, and deserialize (e.g., parallelize) the serialized write data to provide deserialized write data. The SERDES circuit 413 may provide the deserialized write data to the memory array 411. Therefore, during the high-speed write operation, the data is received at the I/O circuit 414 via the data terminal DQ, and is deserialized by the SERDES circuit 413 using the clock signals PHASE 0 to 3.

Additionally, during the high-speed read operation, deserialized read data may be received from the memory array 411. The SERDES circuit 413 may be configured to serialize, in response to a read clock signal (not shown), the deserialized read data so as to provide serialized read data. The SERDES circuit 413 may provide, in response to the read clock signal, the serialized read data to the I/O circuit 414. The read clock signal may be used to support the high-speed read operation by a transceiver of the SERDES circuit 413, thereby serializing the deserialized read data received from the memory array 411. That is, the SERDES circuit 413 may serialize, based on a time sequence of the read clock signal, the deserialized read data, and provide the serialized read data.

Based on the aforementioned memory device, the clock input buffer 402, the clock frequency division circuit 403, and the clock driving circuit 404 are used to provide the clock signals for a semiconductor device to use (e.g., for read and write operations in the memory device). With the development of storage technology, the data transfer rate of the memory device (e.g., a write rate or a read rate) continues to increase, which requires the clock input buffer (i.e., the clock buffer circuit described in the present application) to have a corresponding expansion in a working frequency range to ensure that the memory device can work at the highest data transfer rate. In such case, WCK IB requires a higher bias voltage or bias current to meet the demand for providing the highest working frequency range. Since a control code providing the bias voltage remains constant within the data transfer rate range supported by the memory device, in order to enable the memory device to work at any of these data transfer rates, the clock input buffer needs to always work at the highest frequency range, and the used bias voltage or bias current needs to be always kept maximum, such that the clock input buffer will keep in a high power consumption working state all the time, leading to more power consumption.

In order to solve one or more of the above technical problems, examples of the present application provide a memory device. By adjusting the control code, the clock input buffer may use different bias voltages to reduce the power consumption when the memory device is within different data transfer rate ranges.

Figure 5:
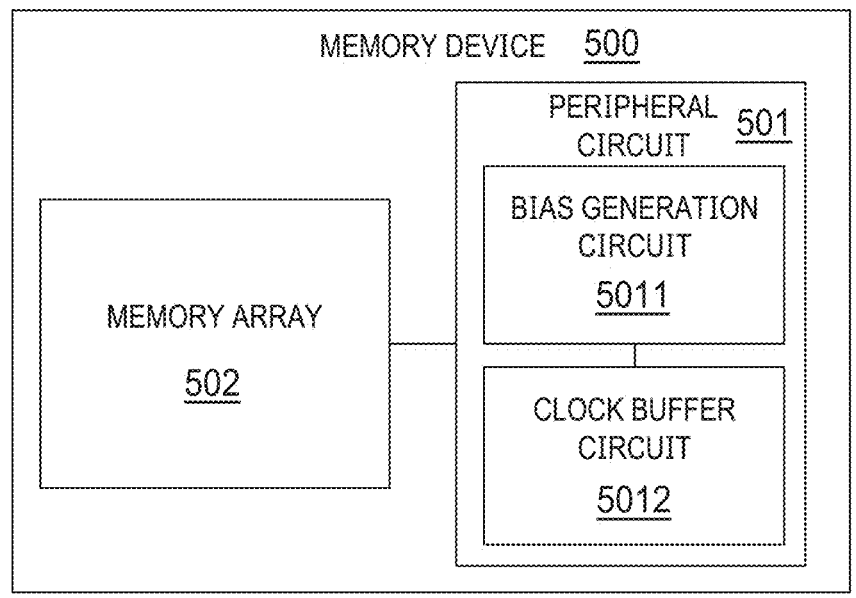
FIG. 5 is a schematic structural diagram III of an example memory device provided by an example of the present application.

In an example, as shown in FIG. 5, examples of the present application provide a schematic structural diagram of yet another memory device. In FIG. 5, the memory device 500 may comprise:

a bias generation circuit 5011 configured to generate a target bias signal according to a data transfer rate of the memory device, wherein the target bias signal varies with a preset data transfer rate range; and a clock buffer circuit 5012 coupled with the bias generation circuit, and configured to perform, based on the target bias signal, conversion processing on an input clock signal matched with the data transfer rate to obtain a target clock signal used by the memory device.

It is to be noted that the bias generation circuit 5011 and the clock buffer circuit 5012 described in FIG. 5 may be included in a peripheral circuit 501 of the memory device 500, wherein the clock buffer circuit 5012 is the same as the above described clock input buffer in function; and the bias generation circuit 5011 provides a bias voltage or bias current for the working of the clock buffer circuit 5012. That is, the bias generation circuit 5011 provides the target bias signal, varying with the preset data transfer rate range, to the clock buffer circuit 5012, such that the clock buffer circuit can perform conversion processing on the input clock signal based on the target bias signal to obtain the target clock signal used by the memory device to read/write data. Under the target clock signal, the memory device can read or write data at any one of the preset data transfer rates. By adopting such design, when the memory device supports different data transfer rate ranges, the clock buffer circuit in the memory device may work under different target bias signals. As described later, when the data transfer rate included in the preset data transfer rates is larger, the target bias signal is also larger, and when the clock buffer circuit works under a larger target bias signal, its power consumption is larger.

Accordingly, in the case where the data transfer rate of the preset data transfer rates is low, the target bias voltage may be lower, which may avoid the clock buffer circuit from always working under the bias signal corresponding to the highest data transfer rate, thereby significantly reducing the power consumption.

Herein, the data transfer rate of the memory device may be configured by a memory device coupled with the memory device to the memory device through some commands. In other words, a configuration code described later represents read latency RL information or write latency WL information corresponding to the memory device, such as RL [3:0] or WL [3:0]. Different read latency RL information or write latency WL information corresponds to different data transfer rates.

In some examples, as the data transfer rate included in the preset data transfer rate range increases, the target bias signal increases, which needs higher power consumption by the clock buffer circuit to buffer, based on the target bias signal, the input clock signal corresponding to the data transfer rate.

That is, if the data transfer rate in the preset data transfer rate range is greater, the clock buffer circuit uses a larger target bias signal to meet the requirements. On the contrary, if the data transfer rate in the preset data transfer rate range is smaller, the clock buffer circuit uses a smaller target bias signal.

For example, assuming that the data transfer rate supported by the memory device is divided into three preset data transfer rate ranges, sequentially comprising: <1067 MHz/s; <2133 MHz/s; <3200 MHz/s; and ≥3200 MHz/s. In this case, <1067 MHz/s corresponds to one target bias signal; 1067 MHz/s-2133 MHz/s corresponds to one target bias signal; 2133 MHz/s-3200 MHz/s corresponds to one target bias signal; and ≥3200 MHz/s corresponds to one target bias signal. Additionally, their corresponding target bias signals are increasingly greater. That is, the power consumption required by the clock buffer circuit is increasingly greater. However, when the data transfer rate configured by the memory device falls within a certain preset data transfer rate range, the target bias signal used is different, that is to say, there is no need for the clock buffer circuit to always keep in a high-power-consumption working mode. Therefore, the power is saved.

Herein, the target bias signal is calculated according to the maximum value within the preset data transfer range. For example, when the preset data transfer range is <1067 MHz/s, the target bias signal is calculated according to the data transfer rate of 1067 MHz/s. Because of this, the clock buffer circuit may comply with the use requirements for the data transfer rate of <1067 MHz/s.

Herein, the input clock signal may be, for example, WCK_T and WCK_N shown in FIG. 4. The target clock signal may refer to an input clock signal obtained after conversion processing by the clock buffer circuit, or is referred to as the internal clock signal described above in FIG. 4.

Figure 6:
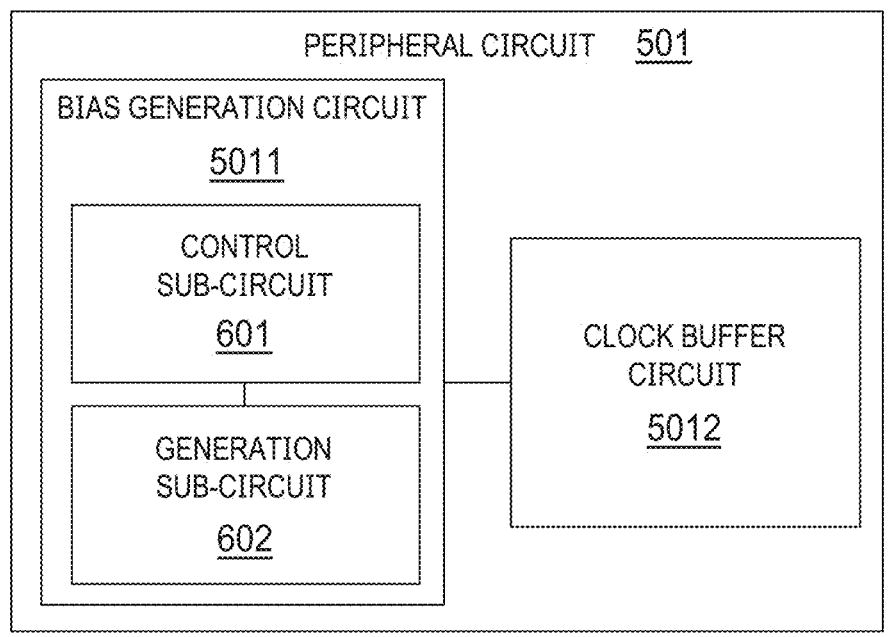
FIG. 6 is a schematic structural diagram IV of an example memory device provided by an example of the present application.

In some examples, as shown in FIG. 6, the bias generation circuit 5011 may comprise a control sub-circuit 601 and a generation sub-circuit 602, wherein the control sub-circuit 601 is configured to obtain a configuration code to characterize the data transfer rate, perform conversion processing on the configuration code to generate a bias control signal, and transmit the bias control signal to the generation sub-circuit; and the generation sub-circuit 602 is coupled with the control sub-circuit, and configured to generate, in response to the bias control signal, the target bias signal.

It is to be noted that the data transfer rate currently used by the memory device may be configured by the memory device to the memory device through some commands. That is, the data transfer rate is characterized using the configuration code, which also means that the different configuration codes characterize that the data transfer rate currently used by the memory device is different.

In some examples, the configuration code may comprise a plurality of bits; and the plurality of bits represent read latency RL information or write latency WL information corresponding to the data transfer rate.

During the practical application, in the case where the memory device is configured with different data transfer rates, the RL information for reading data from the memory device or the WL information for writing data to the memory device is different. The RL information or the WL information is stored, in a form of the configuration code, in the mode register of the memory device as described in FIG. 4.

Figure 7:
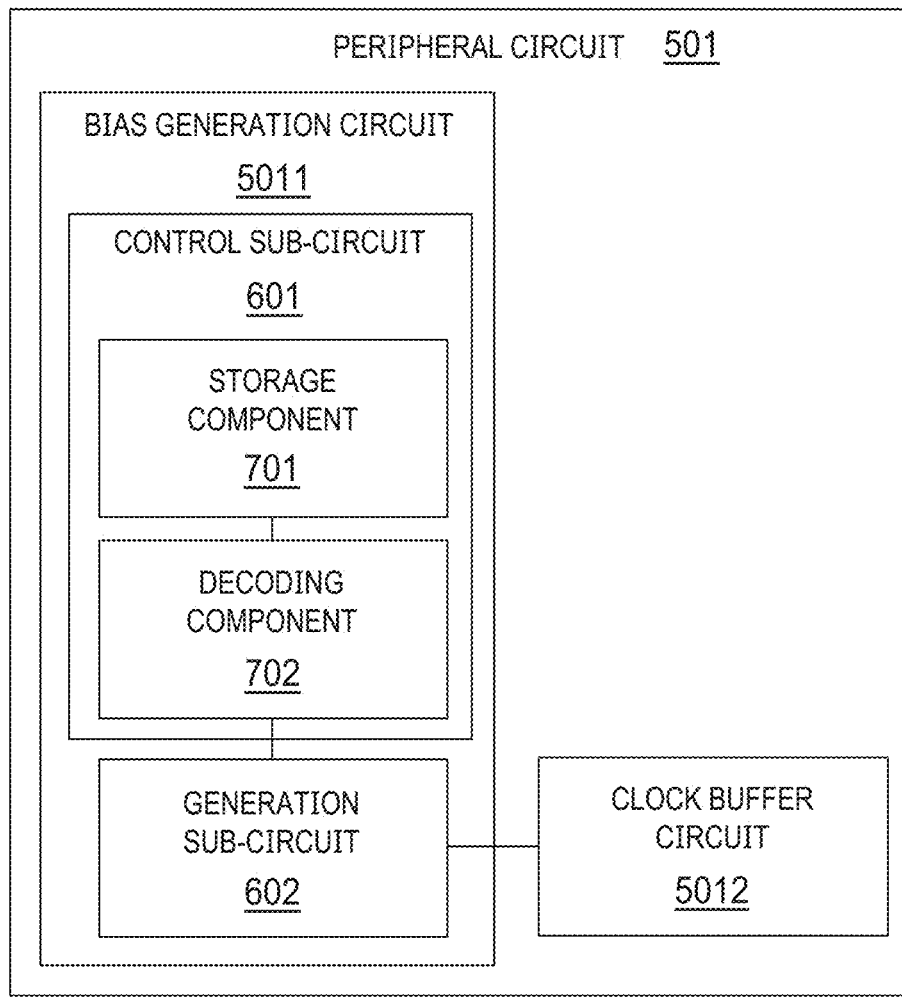
FIG. 7 is a schematic structural diagram V of an example memory device provided by an example of the present application.

In an example, as shown in FIG. 7, the control sub-circuit 601 may comprise a storage circuit 701 and a decoding circuit 702, wherein the storage circuit 701 is configured to store the configuration code; and the decoding circuit 702 is connected with the storage circuit 701, and is configured to obtain the configuration code from the storage circuit 701, and perform conversion processing on the configuration code to generate the bias control signal.

It is to be noted that the storage circuit 701 described here may refer to the mode register described above. The decoding circuit described here may comprise a decoder. The decoder may obtain the configuration code and decode the configuration code to generate the bias control signal. The decoding circuit may be included in a control logic (not shown in FIG. 4) of the memory device. The control logic may be coupled to various circuits in the peripheral circuit described above, such as the voltage generator circuit, the row decoder, etc., and is configured to control operations of various circuits.

In some examples, the decoding circuit 702 is configured to generate the bias control signal according to at least one of the plurality of bits, wherein a plurality of sets of different bias control signals can be generated according to a different value of each of the at least one bit; and the plurality of sets of bias control signals are not simultaneously in a valid state.

In some examples, the configuration code comprises 4 bits, wherein 2 of the 4 bits may be configured to generate 4 sets of bias control signals.

It is to be noted that the configuration code comprises the plurality of bits, while the bias control signal may be generated by at least one of the plurality of bits. Additionally, the number of the bias control signals that may be generated by different numbers of bits is different.

For example, assuming that the configuration code comprises 4 bits, 2 of the 4 bits (e.g., two high bits of the configuration code: RL/WL [3:2]) are utilized to generate the bias control signals, and four different bias control signals may be generated. Assuming again that the data transfer rate range of the memory device is 0-6400 MHZ/s, the range of 0-6400 MHZ/s may be divided into four preset data transfer rate ranges according to the four different bias control signals. For example, a target bias signal corresponding to 0-1067 MHz/s is controlled by one bias control signal (e.g., 00) of the four bias control signals described above; a target bias signal corresponding to 1067 MHz/s-2133 MHz/s is controlled by one bias control signal (e.g., 01) of the four bias control signals described above; a target bias signal corresponding to 2133 MHz/s-3200 MHz/s is controlled by one bias control signal (e.g., 10) of the four bias control signals described above; and a target bias signal corresponding to 3200 MHz/s-6400 MHz/s is controlled by one bias control signal (e.g., 11) of the four bias control signals described above.

During the practical application, there are multiple ways to divide the data transfer rate range supported by the memory device according to the bits included in the configuration code. The aforementioned example is merely one way. For another example, different bias control signals may be generated according to 1, 3 and 4 bits of the 4 bits so as to generate target bias signals matched with different data transfer rate ranges, thereby generating target clock signals.

Figure 8:
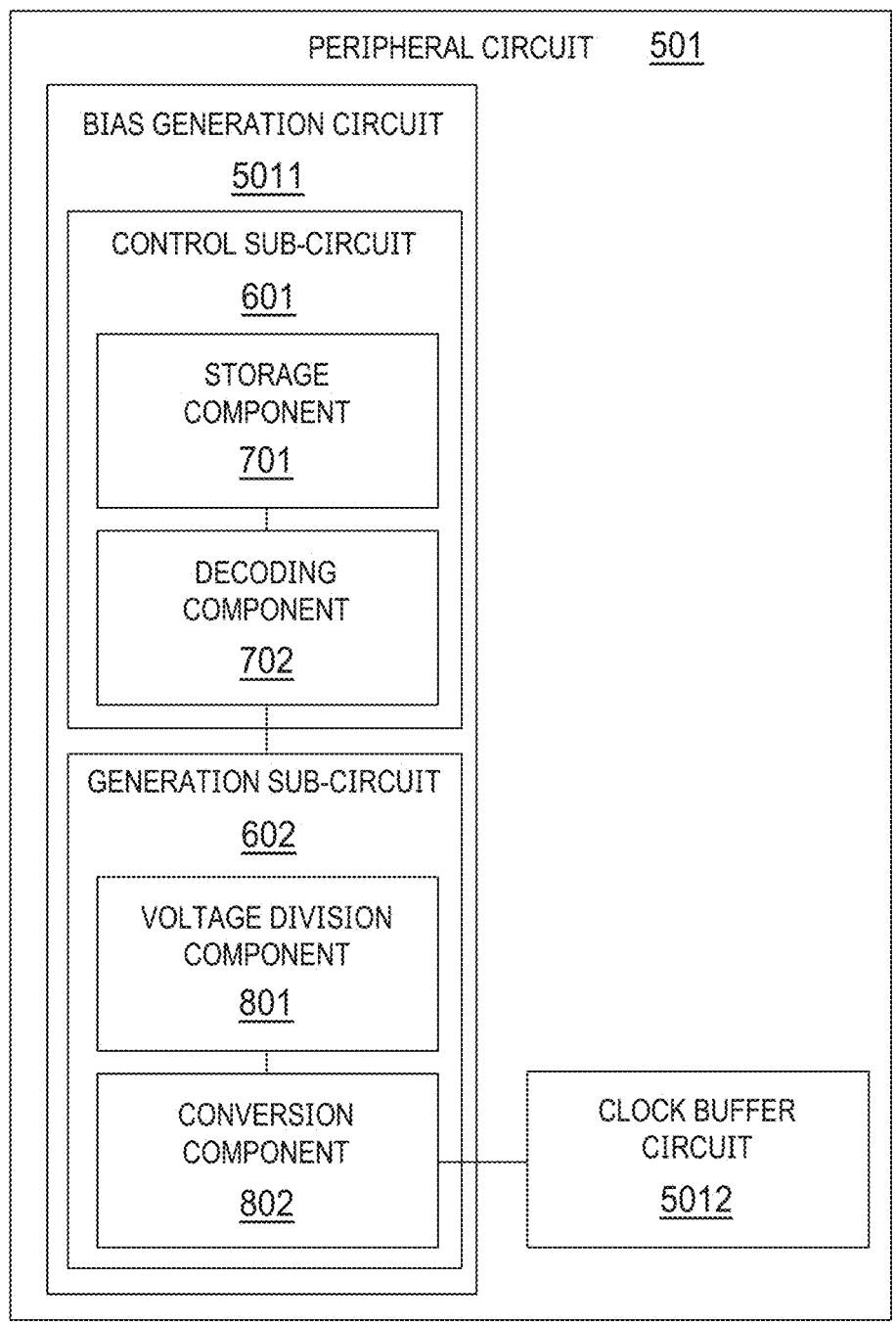
FIG. 8 is a schematic structural diagram VI of an example memory device provided by an example of the present application.

In some examples, as shown in FIG. 8, the target bias signal comprises a bias current signal; and the generation sub-circuit comprises a voltage division circuit 801 and a conversion circuit 802, wherein
the voltage division circuit 801 is configured to perform, in response to the bias control signal, voltage division processing on a reference voltage signal to generate a bias voltage signal; and
the conversion circuit 802 is configured to convert the bias voltage signal to obtain the bias current signal,
wherein the reference voltage signal is obtained according to a maximum data transfer rate supported by the memory device.

It is to be noted that the reference voltage signal described herein may refer to a target bias signal corresponding to the maximum data transfer rate supported by the memory device. In the case where the currently configured data transfer rate of the memory device is smaller than the maximum data transfer rate, a voltage value of the bias voltage signal obtained by the voltage division circuit 801 is smaller than a voltage value of the reference voltage signal. In the case where the currently configured data transfer rate of the memory device is equal to the maximum data transfer rate, the voltage value of the bias voltage signal obtained by the voltage division circuit 801 is equal to the voltage value of the reference voltage signal. That is, in this case, there is actually no voltage division for the reference voltage signal.

During the practical application, the target bias signal used by the clock buffer circuit may be bias current information. Accordingly, after the bias voltage signal is obtained by the voltage division circuit 801, the bias voltage signal may be converted through the conversion circuit 802 so as to obtain the bias current signal.

Figure 9:
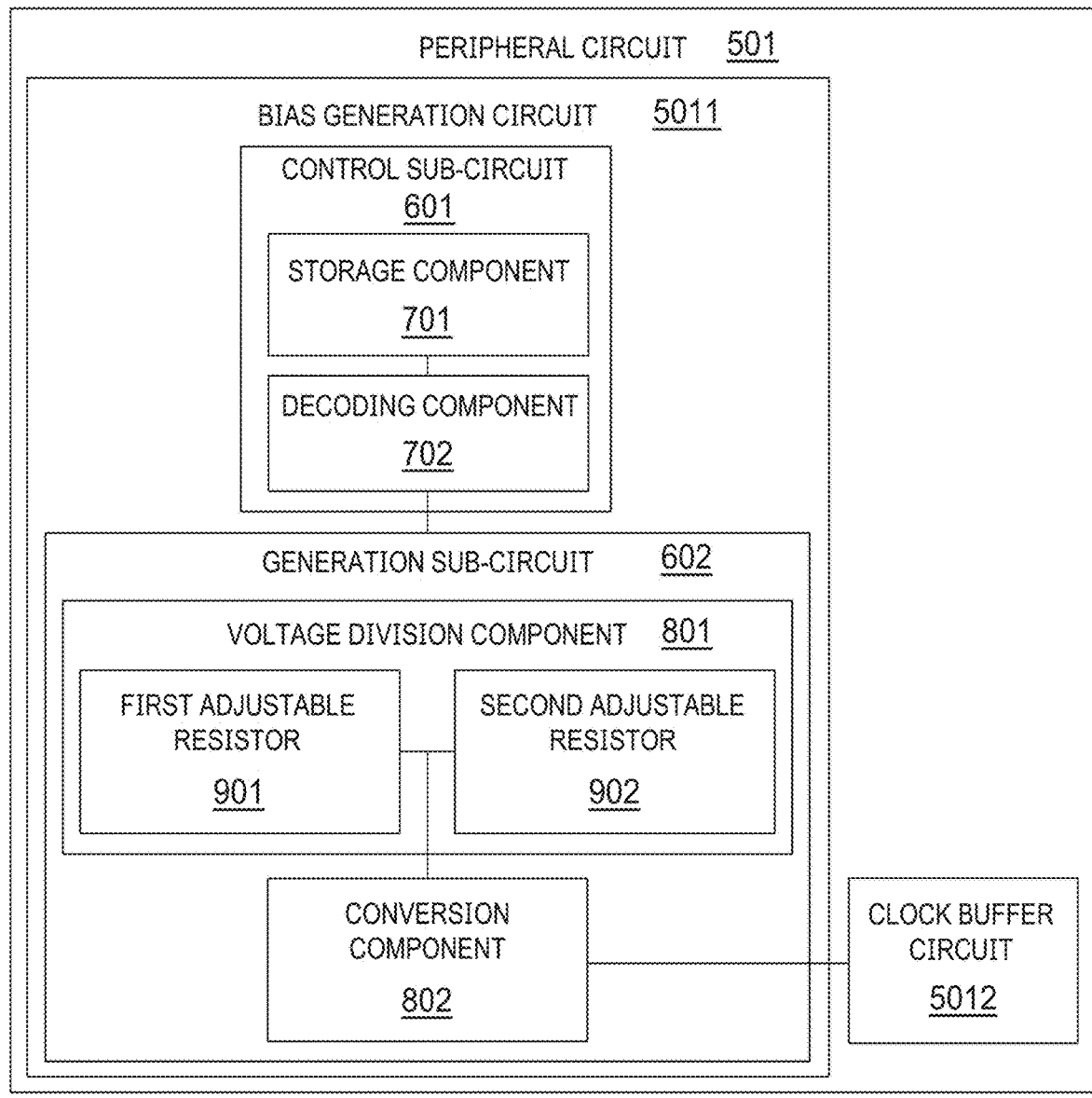
FIG. 9 is a schematic structural diagram VII of an example memory device provided by an example of the present application.

In some examples, as shown in FIG. 9, the bias control signal comprises a first bias control sub-signal and a second bias control sub-signal. The voltage division circuit 801 comprises a first adjustable resistor 901 and a second adjustable resistor 902, wherein
a first end of the first adjustable resistor is connected to the reference voltage signal, a second end of the first adjustable resistor is connected with a first end of the second adjustable resistor, and a control end of the first adjustable resistor is connected to the first bias control sub-signal;
a second end of the second adjustable resistor is grounded; and a control end of the second adjustable resistor is connected to the second bias control sub-signal,
wherein under the control of the first bias control sub-signal and/or the second bias control sub-signal, the bias voltage signal is output at a joint of the first adjustable resistor and the second adjustable resistor.

That is to say, the voltage division circuit may comprise the first adjustable resistor and the second adjustable resistor which are connected in series. The two adjustable resistors are provided with the first bias control sub-signal and the second bias control sub-signal respectively, and under the control of the first bias control sub-signal and/or the second bias control sub-signal, the reference voltage signal is subjected to voltage division processing, and the bias voltage signal is output at a connection of the first adjustable resistor and the second adjustable resistor.

In some examples, the adjustable ranges of the first adjustable resistor and the second adjustable resistor may be the same.

In some examples, the adjustable ranges of the first adjustable resistor and the second adjustable resistor may be different.

That is to say, the present application does not limit the adjustable range of the first adjustable resistor and the second adjustable resistor, as long as both of them can cooperate to achieve the bias voltage signal required by the present application.

In some examples, the first bias control sub-signal and the second bias control sub-signal may be the same.

In some examples, the first bias control sub-signal and the second bias control sub-signal may be different.

That is to say, the present application does not limit whether the first bias control sub-signal and the second bias control sub-signal are the same, as long as both of them can cooperate to control the first adjustable resistor and the second adjustable resistor to output the bias voltage signal required by the examples of the present application.

In some examples, as shown in FIG. 9, the control sub-circuit 601 is further configured to obtain a reference control signal according to the maximum data transfer rate supported by the memory device; and
the voltage division circuit further comprises a reference voltage generator 903, which is connected with the control sub-circuit, and is configured to obtain the reference control signal from the control sub-circuit, and output, in response to the reference control signal, the reference voltage signal.

It is to be noted that the reference voltage signal is generated according to the maximum data transfer rate supported by the memory device. The reference voltage signal has already been described above, which is no longer repeated herein.

Figure 10:
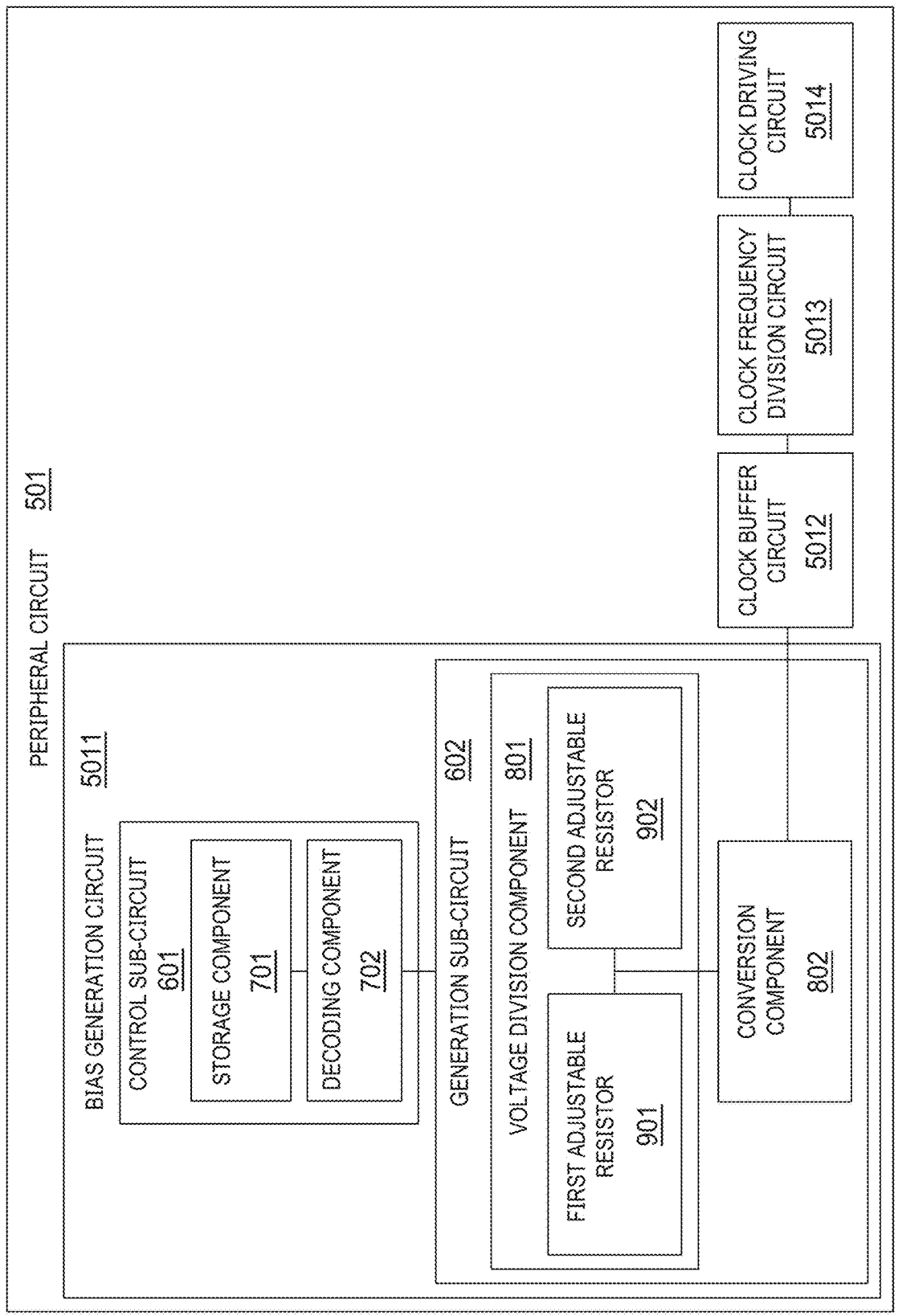
FIG. 10 is a schematic structural diagram VIII of an example memory device provided by an example of the present application.

In some examples, as shown in FIG. 10, the memory device further comprises a clock frequency division circuit 5013 and a clock driving circuit 5014, wherein
the clock frequency division circuit 5013 is connected with the bias generation circuit and the clock buffer circuit respectively, and is configured to perform, in response to the target bias signal, frequency division processing on the target clock signal to generate a multi-path phase-splitting clock signal with adjusted frequency and phase; and
the clock driving circuit 5014 is connected with the bias generation circuit and the clock frequency division circuit respectively, and is configured to transfer, in response to the target bias signal, the multi-path phase-splitting clock signal to a respective I/O circuit in the memory device.

It is to be noted that the clock frequency division circuit 5013 and the clock driving circuit 5014 herein are respectively the same as the clock frequency division circuit and the clock driving circuit in FIG. 4 in structure and function. The working current required by the clock frequency division circuit and the clock driving circuit provided in the examples of the present application may be provided by the target bias signal. However, during the practical application, the magnitude of the bias current signal required by the clock frequency division circuit and the clock driving circuit is different from the magnitude of the bias current signal at the clock buffer circuit. Therefore, during the practical application, although the working current of the clock frequency division circuit and the clock driving circuit may be provided by the target bias signal, in an example, it is necessary to adjust the magnitude of the target bias signal to make the clock frequency division circuit and the clock driving circuit to work normally. Since in the circuit, there are various ways to adjust the magnitude of the bias current signal, how to perform adjustments may be designed according to actual needs.

Figure 11:
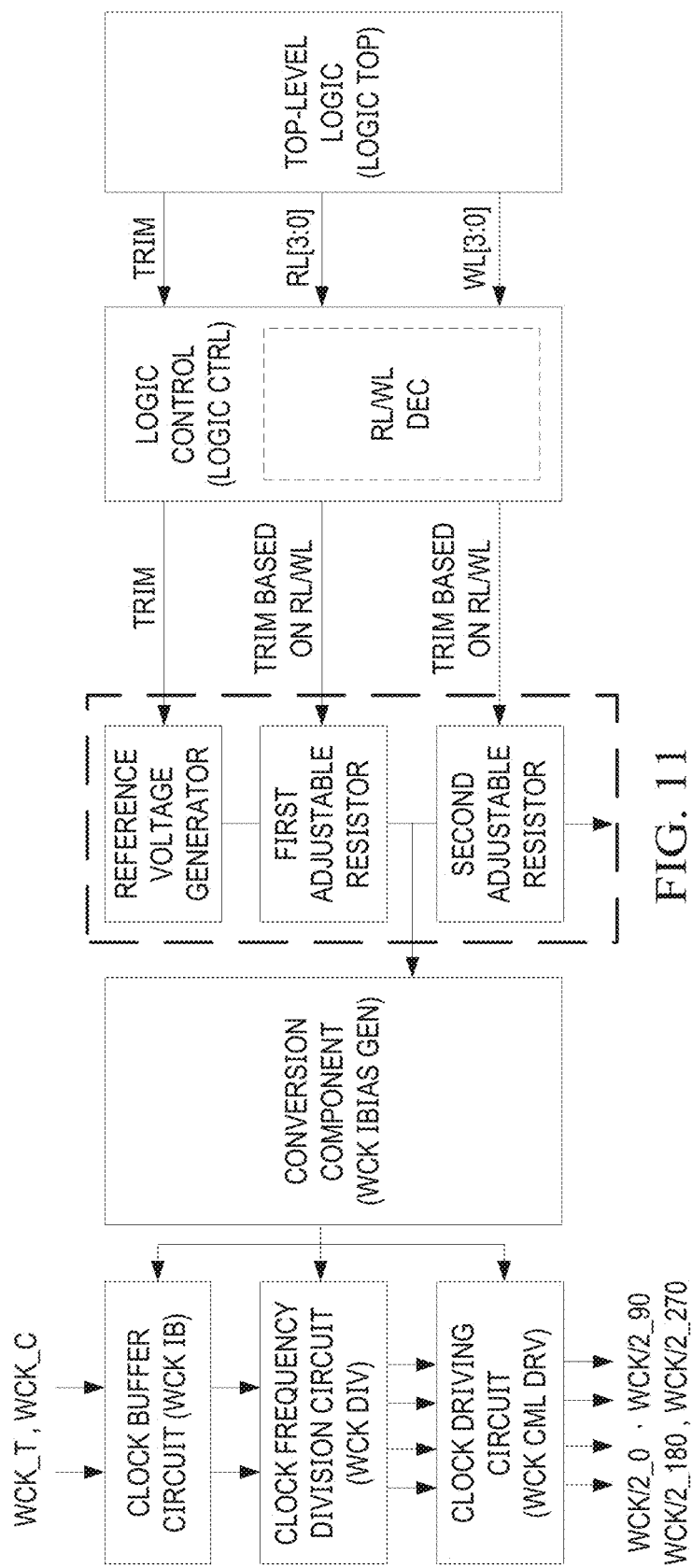
FIG. 11 is a schematic structural diagram IX of an example memory device provided by an example of the present application.

In order to understand the present application, as shown in FIG. 11, FIG. 11 illustrates yet another schematic structural diagram of a memory device provided by examples of the present application. In FIG. 11, a top-level logic (LOGIC TOP) comprises the aforementioned storage circuit, and the storage circuit stores the RL information/WL information characterized by the configuration code, such as the RL information characterized by RL [3:0], and the WL information characterized by WL [3:0]. A control logic (LOGIC CTRL) comprises the aforementioned decoding circuit (RL/WLDEC). The decoding circuit converts RL [3:0] or WL [3:0] and generates a bias control signal (i.e., Trim Based on RL/WL information). Trim represents a reference control signal. WCK IBIAS GEN is the aforementioned conversion circuit. A voltage division circuit comprises a reference voltage generator (VREF GEN), a first adjustable resistor, and a second adjustable resistor. WCK IB is a clock buffer circuit; WCK DIV is a clock frequency division circuit; and WCK CML DRV is a clock driving circuit. A working flow of the memory device shown in FIG. 11 may be as follows: a configuration code corresponding to a data transfer rate configured by the memory device is obtained; the configuration code is transferred to the decoding circuit, and the decoding circuit generates a bias control signal based on the data transfer rate (a first bias control sub-signal acts on the first adjustable sub-resistor and a second bias control sub-signal acts on the second adjustable sub-resistor) to act on the adjustable resistors included in the voltage division circuit, and the voltage division circuit outputs a bias voltage signal; and then, the bias voltage signal is converted into a bias current signal (a target bias signal) through the conversion circuit. Then, the target bias signal is provided to WCK IB, WCK DIV, and WCK CML DRV respectively, so as to convert an input clock signal WCK_T/WCK_C to generate a target clock signal, and then the target clock signal is subjected to frequency division and is driven to a respective I/O circuit for use.

The memory device provided by the examples of the present application controls the working current of WCK IB based on the configuration code corresponding to the data transfer rate without adding a new module, which makes a bias current or a bias voltage of WCK IB vary with a preset data transfer rate range, but the performance of WCK IB still meets the requirements, and the power can be saved. Precise and direct power control of key nodes or modules in the memory device based on the data transfer rate is achieved, and in the case of complying with the performance requirements, the power consumption of WCK IB at different data transfer rates is optimized, and the power is saved.

Figure 12:
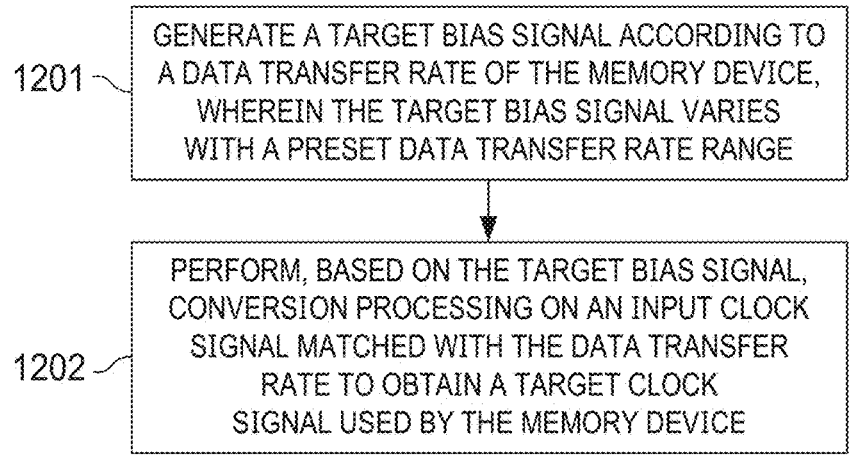
FIG. 12 is a flow diagram of an operation method of a memory device provided by examples of the present application.

Based on the memory device provided by the examples of the present application, as shown in FIG. 12, examples of the present application further provide an operation method of a memory device. The method comprises:

operation 1201: generating a target bias signal according to a data transfer rate of the memory device, wherein the target bias signal varies with a preset data transfer rate range; and operation 1202: performing, based on the target bias signal, conversion processing on an input clock signal matched with the data transfer rate to obtain a target clock signal used by the memory device.

Figure 13:
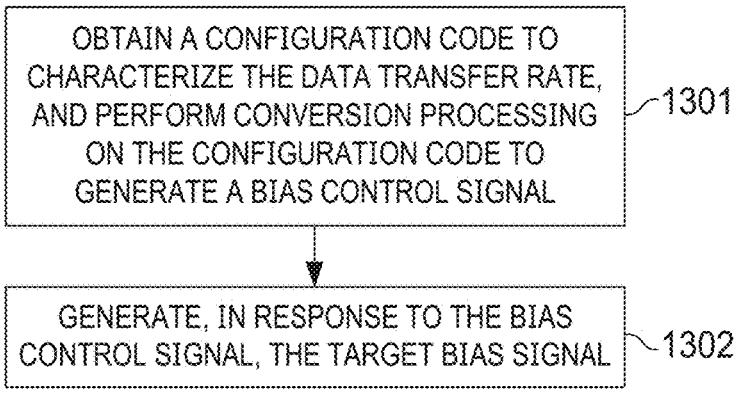
FIG. 13 is a flow diagram of an implementation for operation 1201 provided by examples of the present application.

In some examples, as shown in FIG. 13, for operation 1201, the generating the target bias signal according to the data transfer rate of the memory device comprises:

operation 1301: obtaining a configuration code to characterize the data transfer rate, and performing conversion processing on the configuration code to generate a bias control signal; and operation 1302: generating, in response to the bias control signal, the target bias signal.

In some examples, the target bias signal comprises a bias current signal; and the generating, in response to the bias control signal, the target bias signal comprises:

performing, in response to the bias control signal, voltage division processing on a reference voltage signal to generate a bias voltage signal; and converting the bias voltage signal to obtain the bias current signal, wherein the reference voltage signal is obtained according to a maximum data transfer rate supported by the memory device.

In some examples, the configuration code comprises a plurality of bits; and the plurality of bits represent read latency RL information or write latency WL information corresponding to the data transfer rate.

Figure 14:
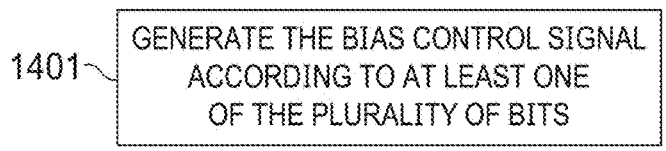
FIG. 14 is a schematic diagram of a processing flow for converting a configuration code provided by examples of the present application.

In some examples, as shown in FIG. 14, the performing the conversion processing on the configuration code to generate the bias control signal comprises:

operation 1401: generating the bias control signal according to at least one of the plurality of bits, wherein a plurality of sets of different bias control signals can be generated according to a different value of each of the at least one bit; and the plurality of sets of bias control signals are not simultaneously in a valid state.

In some examples, the bias control signal comprises a first bias control sub-signal and/or a second bias control sub-signal, wherein under the control of the first bias control sub-signal and/or the second bias control sub-signal, voltage division processing is performed on the reference voltage signal to generate the bias voltage signal.

In some examples, the method further comprises:

performing, in response to the target bias signal, frequency division processing on the target clock signal to generate a multi-path phase-splitting clock signal with adjusted frequency and phase; and transferring, in response to the target bias signal, the multi-path phase-splitting clock signal to a respective I/O circuit in the memory device.

It is to be noted that the operation method of the memory device provided by the examples of the present application is based on the memory device provided above. Therefore, all the features appearing herein have already been illustrated in detail above, reference may be made to the previous description for understanding, which is no longer repeated herein.

Examples of the present application further provide a memory system, which may comprise:
  a memory controller configured to send a first command; and
  one or more memory devices coupled with the memory controller, and configured to configure, in response to the first command, a data transfer rate of the memory device, generate a target bias signal according to the data transfer rate, and perform, based on the target bias signal, conversion processing on an input clock signal matched with the data transfer rate to obtain a target clock signal used by the memory device,
  wherein the target bias signal varies with a preset data transfer rate range.

It is to be noted that the first command may be a configuration command sent by the memory controller and used to configure the data transfer rate currently used by the memory device.

In some examples, the memory device comprises:
  a bias generation circuit configured to generate a target bias signal according to the data transfer rate; and
  a clock buffer circuit coupled with the bias generation circuit, and configured to perform, based on the target bias signal, conversion processing on the input clock signal to obtain the target clock signal.

In some examples, the bias generation circuit comprises a control sub-circuit and a generation sub-circuit, wherein
  the control sub-circuit is configured to obtain a configuration code to characterize the data transfer rate, perform conversion processing on the configuration code to generate a bias control signal, and transfer the bias control signal to the generation sub-circuit; and
  the generation sub-circuit is coupled with the control sub-circuit, and configured to generate, in response to the bias control signal, the target bias signal.

In some examples, the control sub-circuit comprises a storage circuit and a decoding circuit, wherein
  the storage circuit is configured to store the configuration code; and
  the decoding circuit is connected with the storage circuit, and is configured to obtain the configuration code from the storage circuit, and perform conversion processing on the configuration code to generate the bias control signal.

In some examples, the target bias signal comprises a bias current signal; and the generation sub-circuit comprises a voltage division circuit and a conversion circuit, wherein
  the voltage division circuit is configured to perform, in response to the bias control signal, voltage division processing on a reference voltage signal to generate a bias voltage signal; and
  the conversion circuit is configured to convert the bias voltage signal to obtain the bias current signal,
  wherein the reference voltage signal is obtained according to a maximum data transfer rate supported by the memory device.

In some examples, the bias control signal comprises a first bias control sub-signal and a second bias control sub-signal. The voltage division circuit comprises a first adjustable resistor and a second adjustable resistor, wherein
  a first end of the first adjustable resistor is connected to the reference voltage signal, a second end of the first adjustable resistor is connected with a first end of the second adjustable resistor, and a control end of the first adjustable resistor is connected to the first bias control sub-signal;
  a second end of the second adjustable resistor is grounded; and a control end of the second adjustable resistor is connected to the second bias control sub-signal,
  wherein under the control of the first bias control sub-signal and/or the second bias control sub-signal, the bias voltage signal is output at a joint of the first adjustable resistor and the second adjustable resistor.

It is to be noted that the memory system provided by the examples of the present application comprises the above described memory device provided by the examples of the present application, and therefore, the technical features related to the memory device here have already been described above in detail, which are no longer repeated herein.

In several examples provided by the present application, it is to be understood that the disclosed apparatus and method may be implemented by other manners. The apparatus examples as described above are only illustrative, for example, the division of the units is only a logic functional division. In a real implementation, there may be another manner for division. For instance, a plurality of units or components may be combined, or may be integrated in another system, or some features may be omitted or not performed. In addition, the coupling or direct coupling or communication connection between various constituent parts as shown or as discussed may be indirect coupling or communication connection through some interfaces, apparatuses or units, and may be electrical, mechanical or other forms.

The above-mentioned units described as separate components may or may not be physically separated. The components shown as units may or may not be physical units, that is, they may be located in one place, or may be distributed onto a plurality of network units. According to actual needs, part or all of the units may be selected for realizing the purposes of the solution of the example.

In addition, various functional units in each example of the present application may be all integrated into one processing unit, or each unit may serve as one unit individually, or two or more units may be integrated into one unit. The above-mentioned integrated unit may be implemented in a hardware form or in a form of hardware and software functional units.

Those of ordinary skill in the art may understand that all or part of the steps of the above-mentioned method examples may be completed by a program instruction related hardware. The aforementioned program may be stored in a computer-readable storage medium, and the steps including the above-mentioned method examples are performed when the program is executed; and the aforementioned storage medium includes various media that can store program codes, such as a mobile storage device, a Read-Only Memory (ROM), a Random Access Memory (RAM), a magnetic disk, or an optical disk, or the like.

Alternatively, the above integrated unit of the present application, if being implemented in a form of a software functional module and serving as an individual product for sales or use, may also be stored in a computer readable storage medium. Based on such understanding, the technical solutions of the examples of the present application are essentially embodied in a form of a software product, or a portion contributing to the prior art may be embodied in a form of a software product. The computer software product is stored in a storage medium, including several instructions to cause a computer apparatus (which may be a personal computer, a server, or a network apparatus, or the like) to execute all or part of the method of various examples of the present application. The aforementioned storage medium comprises media that can store program code, such as a mobile storage apparatus, a ROM, a RAM, a magnetic disk, or an optical disk, or the like.

Based on the aforementioned solution, the present application further provides an electronic device, comprising one or more of the above-mentioned memory devices, and configured to store data; and a processor coupled the memory device and communicating with the memory.

In some examples, the processor and the memory are integrated on the same printed circuit board.

In some examples, the electronic device may further comprise a memory controller. The memory controller is coupled with the memory and the processor, and the processor communicates with the memory through the memory controller, wherein the processor and the memory controller are integrated on the same die, and the die and the memory are integrated on the same printed circuit board. An example is shown in FIG. 2.

It is to be noted that the electronic device, and the aforementioned memory device and the operation method belong to the same inventive concept. The electronic device comprises the aforementioned memory or memory system. Additionally, in different electronic device structures, the processor and the memory are integrated on the same PCB, or the processor and the memory controller are integrated on the same PCB. The processor appearing herein may be a graphics processing unit (GPU). Therefore, the nouns appearing herein have been explained in detail above and are equally applicable here, which are no longer repeated here one by one. It is to be understood that only the structures most relevant to the technical solutions of the present application are described herein. The electronic device provided by the present application may further comprise the structure and description of the electronic apparatus shown in FIG. 1. The electronic device further comprises structures that are necessary for the normal working of the electronic apparatus but not shown. In view of the length of the application document, they are no longer repeated one by one in the present application.

The above descriptions are only examples of the present application, and are not used to limit the protection scope of the present application.

What is claimed is:

1. A memory device, comprising:
a bias generation circuit configured to generate a target bias signal according to a data transfer rate, wherein the target bias signal varies with a preset data transfer rate range; and
a clock buffer circuit coupled with the bias generation circuit and configured to perform, based on the target bias signal, conversion processing on an input clock signal matched with the data transfer rate to obtain a target clock signal.

2. The memory device of claim 1, wherein the bias generation circuit comprises:
a control sub-circuit; and
a generation sub-circuit, wherein
the control sub-circuit is configured to obtain a configuration code to characterize the data transfer rate, perform conversion processing on the configuration code to generate a bias control signal, and output the bias control signal to the generation sub-circuit; and
the generation sub-circuit is coupled with the control sub-circuit, and configured to generate, based on the bias control signal, the target bias signal.

3. The memory device of claim 2, wherein the control sub-circuit comprises:
a storage circuit configured to store the configuration code; and
a decoding circuit connected with the storage circuit and configured to obtain the configuration code from the storage circuit, and perform conversion processing on the configuration code to generate the bias control signal.

4. The memory device of claim 2, wherein the target bias signal comprises a bias current signal; and the generation sub-circuit comprises:
a voltage division circuit configured to perform, in response to the bias control signal, voltage division processing on a reference voltage signal to generate a bias voltage signal; and
a conversion circuit configured to convert the bias voltage signal to obtain the bias current signal.

5. The memory device of claim 4, wherein the bias control signal comprises a first bias control sub-signal and a second bias control sub-signal; and the voltage division circuit comprises:
a first adjustable resistor including a first end, a second end coupled to a first end of a second adjustable resistor and a control end coupled to the first bias control sub-signal, wherein the first end is configured to receive the reference voltage signal; and
the second adjustable resistor including a second end and a control end coupled to the second bias control sub-signal,
wherein under control of the first bias control sub-signal and/or the second bias control sub-signal, the bias voltage signal is output at a joint of the first adjustable resistor and the second adjustable resistor.

6. The memory device of claim 5, wherein an adjustable range of the first adjustable resistor and that of the second adjustable resistor are the same.

7. The memory device of claim 5, wherein the first bias control sub-signal and the second bias control sub-signal are the same.

8. The memory device of claim 5, wherein the control sub-circuit is further configured to obtain a reference control signal according to a maximum data transfer rate supported by the memory device; and
the voltage division circuit further comprises:
a reference voltage generator connected with the control sub-circuit and configured to:
obtain the reference control signal from the control sub-circuit, and
output, based on the reference control signal, the reference voltage signal.

9. The memory device of claim 3, wherein the configuration code comprises a plurality of bits, and the plurality of bits represent read latency RL information or write latency WL information corresponding to the data transfer rate.

10. The memory device of claim 9, wherein the decoding circuit is configured to generate the bias control signal according to at least one of the plurality of bits.

11. The memory device of claim 10, wherein the configuration code comprises 4 bits, wherein two of the 4 bits can be configured to generate 4 sets of bias control signals.

12. The memory device of claim 1, wherein the memory device further comprises:

a clock frequency division circuit respectively connected with the bias generation circuit and the clock buffer circuit, and configured to perform, based on the target bias signal, frequency division processing on the target clock signal to generate a multi-path phase-splitting clock signal with adjusted frequency and phase; and a clock driving circuit respectively connected with the bias generation circuit and the clock frequency division circuit, and configured to transfer, based on the target bias signal, the multi-path phase-splitting clock signal to a respective I/O circuit in the memory device.

13. The memory device of claim 1, wherein larger a data transfer rate included in the preset data transfer rate range is, larger the target bias signal is.

14. A method of operating a memory device, comprising:
generating a target bias signal according to a data transfer rate of the memory device, wherein the target bias signal varies with a preset data transfer rate range; and performing, based on the target bias signal, conversion processing on an input clock signal matched with the data transfer rate to obtain a target clock signal used by the memory device.

15. The method of claim 14, wherein the generating the target bias signal according to the data transfer rate of the memory device comprises:
obtaining a configuration code to characterize the data transfer rate, and performing conversion processing on the configuration code to generate a bias control signal; and generating, based on the bias control signal, the target bias signal.

16. The method of claim 15, wherein the target bias signal comprises a bias current signal; and the generating, in response to the bias control signal, the target bias signal comprises:
performing, in response to the bias control signal, voltage division processing on a reference voltage signal to generate a bias voltage signal; and converting the bias voltage signal to obtain the bias current signal.

17. The method of claim 15, wherein the configuration code comprises a plurality of bits; and
the plurality of bits represent read latency RL information or write latency WL information corresponding to the data transfer rate.

18. The method of claim 17, wherein the performing the conversion processing on the configuration code to generate the bias control signal comprises:
generating the bias control signal according to at least one of the plurality of bits.

19. The method of claim 14, wherein the method further comprises:
performing, based on the target bias signal, frequency division processing on the target clock signal to generate a multi-path phase-splitting clock signal with adjusted frequency and phase; and transferring, based on the target bias signal, the multi-path phase-splitting clock signal to a respective I/O circuit in the memory device.

20. A memory system, comprising:
a memory controller configured to send a first command; and one or more memory devices coupled to the memory controller, and configured to:
configure, in response to the first command, a data transfer rate;

generate a target bias signal according to the data transfer rate; and perform, based on the target bias signal, conversion processing on an input clock signal matched with the data transfer rate to obtain a target clock signal used by the memory device, wherein the target bias signal varies with a preset data transfer rate range.

* * * * *